United States Patent [19]

Akiyama et al.

[11] Patent Number: 4,720,722
[45] Date of Patent: Jan. 19, 1988

[54] BACK LID OF A CAMERA

[75] Inventors: Kazuhiro Akiyama; Syunji Nishimura, both of Saitama; Nobuyuki Kameyama, Tokyo; Nobuo Tobayama, Saitama; Katsuya Kozai, Tokyo, all of Japan

[73] Assignee: Fuji Photo Film Co., Ltd., Kanagawa, Japan

[21] Appl. No.: 912,680

[22] Filed: Sep. 26, 1986

[30] Foreign Application Priority Data

Sep. 27, 1985 [JP] Japan .............................. 60-147839[U]
Oct. 9, 1985 [JP] Japan .............................. 60-154468[U]

[51] Int. Cl.$^4$ ............................................. G03B 17/00
[52] U.S. Cl. .................................... 354/203; 354/288
[58] Field of Search ................ 354/203, 288; 352/221, 352/226, 227

[56] References Cited

U.S. PATENT DOCUMENTS

| 2,645,170 | 7/1953 | Heidecke | 354/203 |
| 3,002,438 | 10/1961 | Trow | 354/203 |
| 3,311,037 | 3/1967 | Winkler | 354/203 |
| 3,707,904 | 1/1973 | Engelsmann et al. | 354/203 |
| 4,034,388 | 7/1977 | Iwashita et al. | 354/203 |
| 4,487,491 | 12/1984 | Inaba | 352/227 X |

Primary Examiner—A. A. Mathews
Attorney, Agent, or Firm—Young & Thompson

[57] ABSTRACT

An integrated plastic back lid for cameras is provided with a reinforcing metal plate firmly attached to the back lid for preventing the back lid from being deformed and a pressure plate for holding a film flat which is held resiliently by the reinforcing plate. For resiliently holding the pressure plate, resiliently deformable holding arms are integrally formed either on the pressure plate or on the reinforcing plate. The pressure plate and the reinforcing plate are assembled before being attached to the back lid.

4 Claims, 6 Drawing Figures

BACK LID OF A CAMERA

BACKGROUND OF THE INVENTION

The present invention relates to a back lid of a camera, and more particularly to a back lid with a pressure plate which can hold film flat.

It is known in the art to use an integrally formed plastic camera body and a back lid, which have the advantages of lightening weight and reducing manufacturing cost. This plastic camera body is generally box-shaped, which gives it sufficient strength. However, the back is plate-shaped and tends to be insufficient in strength and to be deformed upon applying an external force thereto.

The back lid is provided with a pressure plate for pressing film loaded in a camera to hold it flat. As the pressure plate is to be press resiliently the film from the rear, the pressure plate is provided with resiliently deformable members such as leaf springs which at their ends are fixed to the camera back lid, so that they are slightly resiliently deformably movable lengthwise.

Even though there are resiliently deformable members between the pressure plate and the integrally formed plastic back lid, the pressure applied by the pressure plate is apt to be distributed unevenly over the film when the back lid is deformed, making it difficult to hold the film flat. For eliminating this difficulty, it would suffice from a structural standpoint to provide a supplemental reinforcing frame member fixed to the back lid. But this would result in an increased number of parts, disadvantageous assembly operations, and increased manufacturing cost.

On the other hand, the conventional pressure plate, as described above, has a structure which makes it difficult to decrease the number of parts and to simplify its assembly operations.

From the point of view of economy, the resiliently deformable members can be formed as leaf springs integral with the pressure plate, from a single metal plate. But in this case, the single metal plate must be thin enough to provide the leaf springs with a suitable resilient deformability. However, a thin metal plate is unable to provide the pressure plate with the rigidity necessary to maintain the film optically flat. A pressure plate integral with the leaf springs, therefore, is technically impractical.

Integrally formed plastic pressure plates, provided instead of the aforementioned metal pressure plate, also have serious problems in that it is hard not only to maintain the leaf springs with a constant resiliency but also to give them a proper and sufficient strength. An additional problem is that such an integrally formed plastic pressure plate is apt to be deformed non-resiliently by repeated use.

OBJECTS OF THE INVENTION

It is, therefore, an object of the present invention to provide a plastic back lid for a camera, which is sufficient strong and which entails neither an increase in the number of parts nor a decrease in the efficiency of the assembly operations.

It is another object of the present invention to provide a plastic back lid having a pressure plate formed integrally therewith, having resiliently deformable leaf spring members, which is easy to assemble.

It is a further object of the present invention to provide a plastic back lid having a pressure plate formed integrally therewith, having resiliently deformable leaf spring members, in which the leaf spring members are sufficiently and properly resilient although the pressure plate is rigid.

It is a still further object of the present invention to provide a plastic back lid which is easy to assemble and low in cost.

SUMMARY OF THE INVENTION

In accordance with the aforementioned objects there is provided a plastic back lid for cameras, which comprises an integrally formed plastic back lid, a reinforcing plate fixedly attached to the inside of the back lid, and a pressure plate.

According to an embodiment of the present invention, the reinforcing plate is formed integrally with resiliently deformable spring members on which a pressure plate is supported for axial movement. The provision of such a reinforcing plate can increase the structural strength of the plastic back lid itself so as to prevent the back lid from being deformed, thereby achieving a uniform pressure distribution by the pressure plate over the film when the plastic back lid is closed.

Accordingly to another embodiment of the present invention, a pressure plate to be mounted on the reinforcing plate comprises a thin, resilient metal plate formed integrally with deformable spring members and a plastic pressure plate member in which the thin, resilient metal plate is embedded by molding. This integrated pressure plate has the advantage of being easily mountable on the back lid. In addition, the integrated pressure plate can provide not only the resiliency of the deformable spring members but also a sufficient rigidity of the pressure plate member.

BRIEF DESCRIPTION OF THE DRAWINGS

For a fuller understanding of the invention, reference should be had to the following detailed description, taken with the accompanying drawings, wherein.

DETAILED DESCRIPTION OF THE INVENTION

Figure 1:
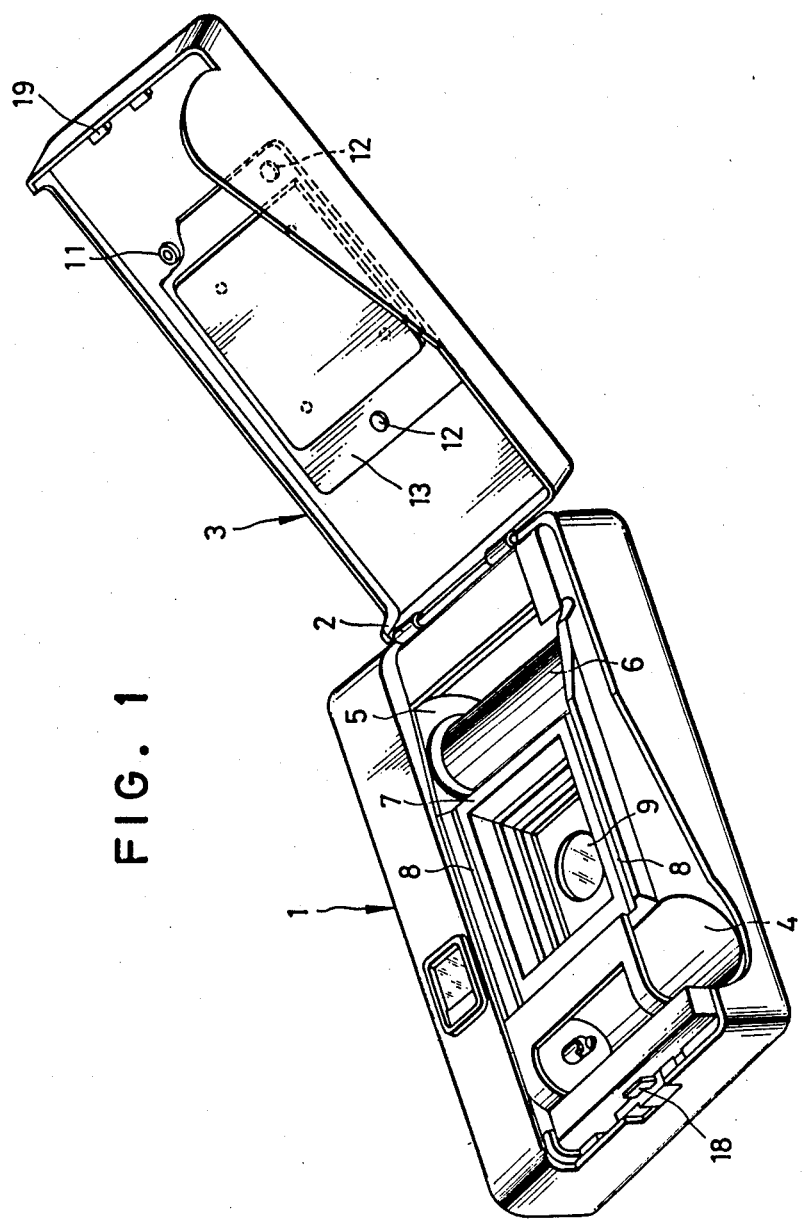
FIG. 1 is a perspective view of a camera with its back lid open, embodying the present invention.

Referring now to FIG. 1, there is shown a camera with a back lid embodying the present invention, comprising camera body 1 having a hinge 2 by which a back lid 3 is swingably mounted on body 1 for opening and closing movement. The camera body 1 at its rear side is formed with a film supply chamber 4 and a film take-up chamber 5 in which a film take-up spool 6 is installed. Between these chambers there is an exposure frame 7 for defining an exposure area of a film. On the upper and lower sides of the exposure frame 7 there are provided film guide members 8, 8 parallel to each other which lie in the focal plane of an objective lens 9. The inside of the camera body 1 is covered in a light-tight fashion by the back lid 3.

The integrally molded plastic back lid 3 is provided with plastic bosses 11 integrally formed therewith at three different positions inside the back lid 3. These bosses 11, which are formed with female threads, are threadingly engageable with set screws 12. Through this boss and screw engagement a reinforcing plate 13 is firmly attached to the back lid 3. This reinforcing plate 13 is made of a resiliently deformable member, for example a relatively thin metal plate. The reinforcing plate 13 thus attached to the plastic back lid 3 is adapted to reinforce the plastic back lid 3 so as to prevent the deformation thereof due to an external force applied thereto.

Figure 2:
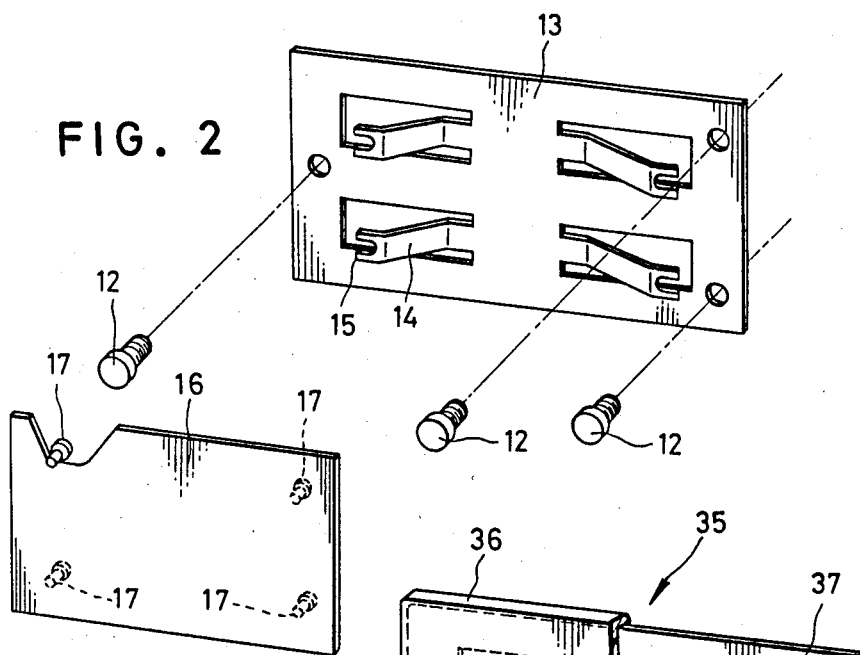
FIG. 2 is an exploded perspective view of the pressure plate assembly incorporated inside the back lid of FIG. 1.

As is shown in FIG. 2, the reinforcing plate 13 is provided with four holding arms 14 parallel to each other, each of which is press-formed and bent upwardly. Each holding arm 14 at its end is formed with a slot-like notch 15 in which a headed-pin 17 on the back of the pressure plate 16 is slidably received for relative movement lengthwise of arm 14. This relative movement allows the holding arms 14 to bend resiliently downwardly, making is possible to move the pressure plate 16 in the direction of the optical axis of the objective lens 9. Therefore, the pressure plate 16 is resiliently held by the reinforcing plate 13 for such axial movement.

By closing the plastic back lid 3 constructed as described above, thereby covering the inside of the camera body 1 in a light-tight fashion, the pressure plate 16 is moved against the exposure frame 7 and into contact with the guide rails 8 on the upper and lower sides of the exposure frame 7. Upon pressing the plastic back lid 3 against the camera body 1 to close fully the back lid 3 and to hold the same closed through the engagement between a hook 18 disposed on the camera body 1 and a jaw 19 disposed on the back lid 3, the holding arms 14 are resiliently deformed, causing the pressure plate 16 to be forced against the guide rails 8. If there is film in the camera, the film will be held flat between an exposure frame 7 and the pressure plate 16.

Figure 3:
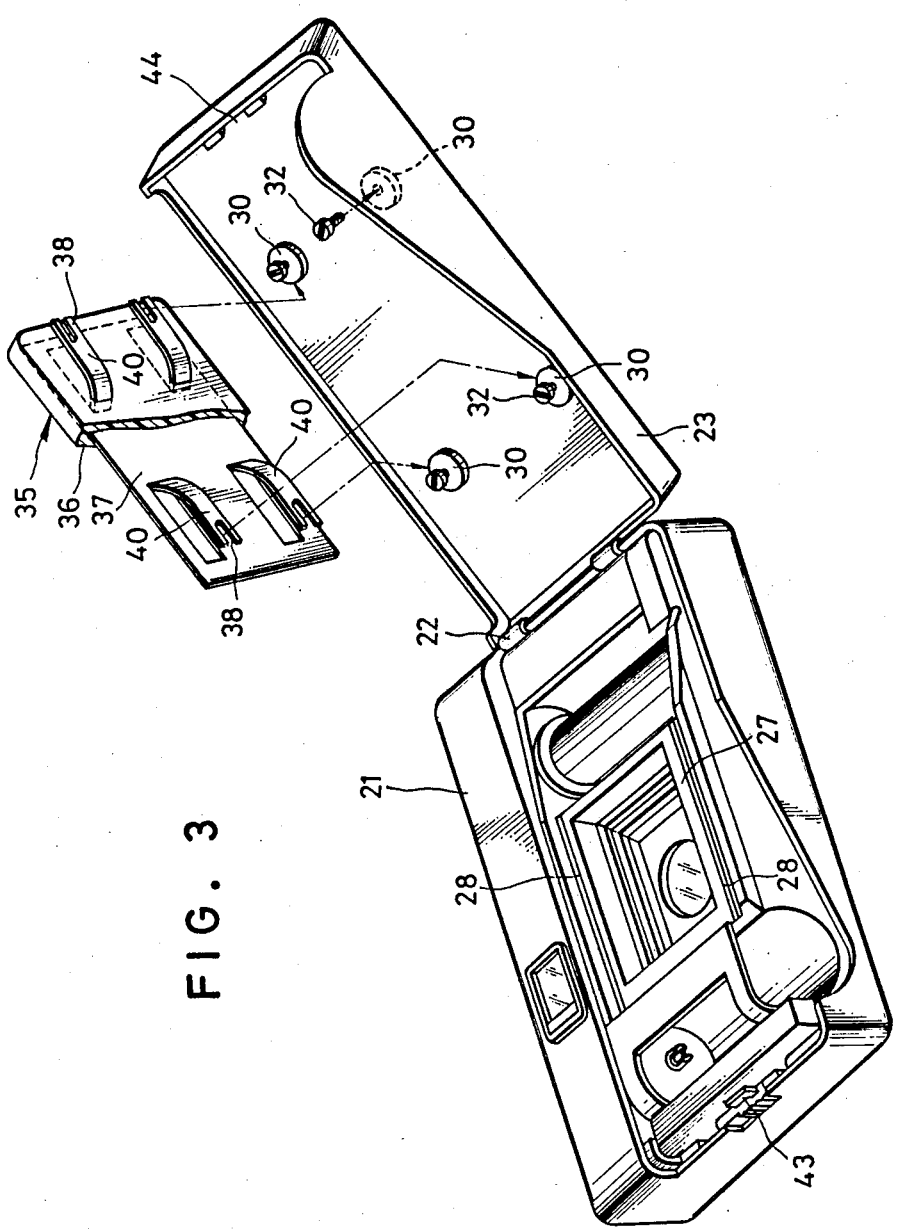
FIG. 3 is a perspective view of another camera with its back lid opened, embodying the present invention.
Figure 4:
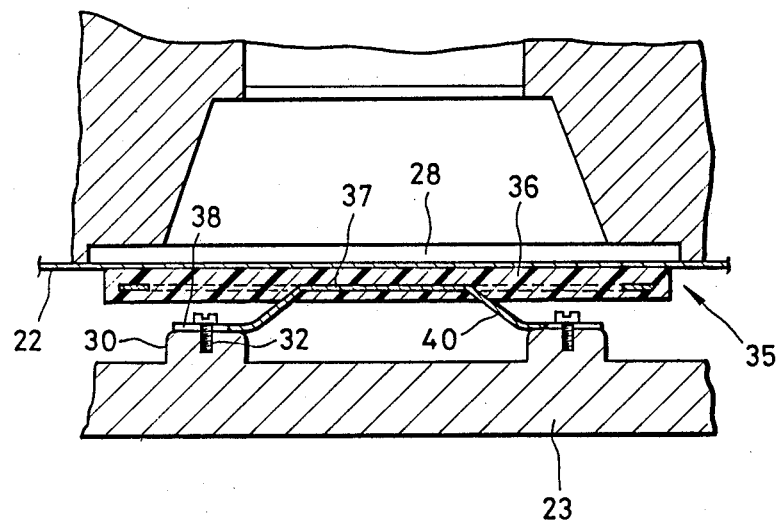
FIG. 4 is a cross sectional view of an essential part of the camera of FIG. 3, with the back lid opened.

Referring to FIGS. 3 and 4 showing another embodiment of the back lid according to the present invention, there is depicted a camera comprising a camera body 21 having a hinge 22 by which an integrally formed plastic back lid 23 is swingably mounted on the camera body 21, much the same as in the above-described embodiment shown in FIG. 1. The plastic back lid 23 is provided with four plastic bosses 30 integrally formed therewith. These bosses 30, which are formed with female threads, are threadingly engaged by headed-screws 32 leaving space between the head and the top of the boss for receiving the end of a holding arm 40 of a pressure plate 35 which will be described in detail hereinafter.

The pressure plate 35 comprises a plastic plate member 36 and a thin metal plate member 37 integrally formed with the holding arms 40, the thin metal plate member 37 being embedded in the plastic plate member 36 by molding. The thin metal plate member 37 is punched out in such a way as to provide the raised holding arms 40 having each a slot-like notch 38. As each holding arm 40 is a part of the thin metal plate member 37, it is resiliently deformable. The thin metal plate member 37 thus made is put in a mold for the plastic plate member 36 and then embedded in the plastic plate member 36 when the latter is molded, thereby providing an integrated pressure plate 35 with the holding arms 40 exposed on the outside.

The integrated pressure plate 35 made in the manner described above is mounted on the back lid 23 through a rough engagement between the slot-like notches 38 and the headed screws 32 so as to allow the integrated pressure plate 35 to move back or forth upon the resilient deformation of the holding arms 40. Thus the integrated pressure plate 35 is resiliently held by the plastic back lid 23 for movement along the optical axis.

In the same way as in the above-described embodiment, when closing the plastic back lid 23 and covering the inside of the camera body 21 in a light-tight fashion, the integrated pressure plate 35 is moved against the exposure frame 27 and into contact with the guide rails 28 on the upper and lower sides of the exposure frame 27. Upon pressing the plastic back lid 23 against the camera body 21 to close fully the back lid 23 and to hold the same closed by means of the engagement between a hook 43 disposed on the camera body 21 and a jaw 44 disposed on the plastic back lid 23, the holding arms 40 are resiliently deformed, causing the integrated pressure plate 35 to be forced against the guide rails 28. If there is film in the camera, the film will be held flat between the exposure frame 27 and the integrated pressure plate 35, as shown in FIG. 4.

Figure 5:
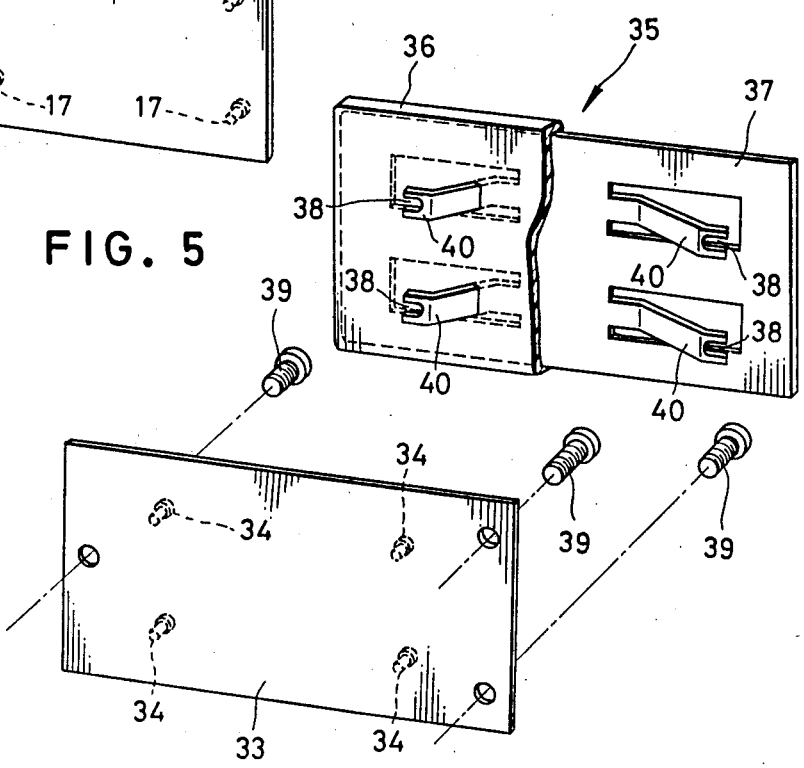
FIG. 5 is an exploded perspective view similar to FIG. 2 but showing another example of the pressure plate assembly.

In a similar manner as in the previous embodiment, there can be firmly attached, to the inside of the plastic back lid 23, a reinforcing metal plate 33 (see FIG. 5) having four headed pins 34 with which the holding arms 40 receive in their slot-like notches 38. Before attaching the reinforcing metal plate 33 to the back lid 23 by means of set screws 39, the pressure plate 35 and the reinforcing metal plate 33 which are shown in FIG. 5 are first assembled as a unit.

Figure 6:
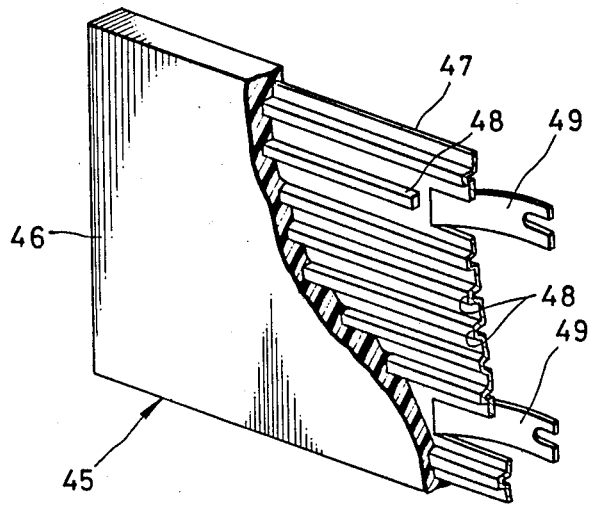
FIG. 6 is a perspective view, partly broken away, of an example of the pressure plate.

FIG. 6 shows still another example of a pressure plate 45 of the type comprising a plastic plate member 46 and a thin metal plate member 47. In this example, the thin metal plate member 47 to be embedded in the plastic plate member 46 is characterized in that there are corrugations 48 having U-shaped cross section which extend parallel to the holding arms 49. These corrugations 48 are formed at the time of forming the holding arms 49. The provision of the corrugated metal plate member 47 results in not only increased rigidity of but also permanent flatness of the pressure plate 45.

What is claimed is:

1. In combination with a back lid for opening and closing the rear of a camera body, a molded plastic plate, and molded in said plastic plate a thin plate of resilient metal, said metal plate having integral holding arms thereon that emerge from said plastic plate and yieldably engage said lid.

2. Structure as defined in claim 1, said plastic plate being elongated, said arms extending in the direction of the length of said plastic plate and being grouped in two sets of arms, the arms of each said set extending in a direction opposite the arms of the other said set.

3. A plastic back lid for opening and closing the rear of a camera body, a reinforcing plate firmly attached to said plastic back lid so as to prevent the deformation of said plastic back lid under external force; and a pressure plate for pressing film flat, said pressure plate comprising a molded plastic plate, and molded in said plastic plate a thin plate of resilient metal, said metal plate having integral folding arms thereon that emerge from said plastic plate and yieldably engage said reinforcing plate.

4. A structure as defined in claim 3, said plastic plate being elongated, said arms extending in the direction of the length of said plastic plate and being grouped in two sets of arms, the arms of each said set extending in a direction opposite the arms of the other said set.

* * * * *